United States Patent
Keulers et al.

(10) Patent No.: US 10,297,020 B2
(45) Date of Patent: May 21, 2019

(54) STEREOSCOPIC SYSTEM AND METHOD FOR QUALITY INSPECTION OF CIGARETTES IN CIGARETTE PACKER MACHINES

(71) Applicant: Datalogic IP Tech, S.r.l., Bologna (IT)

(72) Inventors: Ivar Keulers, Born (NL); Domenico Pozzetti, Bologna (IT); Alessandro Franchi, Bologna (IT)

(73) Assignee: Datalogic IP Tech S.R.L., Calderara di Reno, Bologna (IT)

( * ) Notice: Subject to any disclaimer, the term of this patent is extended or adjusted under 35 U.S.C. 154(b) by 144 days.

(21) Appl. No.: 14/858,990

(22) Filed: Sep. 18, 2015

(65) Prior Publication Data
US 2017/0084020 A1     Mar. 23, 2017

(51) Int. Cl.
G06T 7/00      (2017.01)
H04N 13/239    (2018.01)
H04N 13/271    (2018.01)
H04N 13/128    (2018.01)
H04N 5/225     (2006.01)

(52) U.S. Cl.
CPC ......... *G06T 7/0008* (2013.01); *H04N 5/2256* (2013.01); *H04N 5/2258* (2013.01); *H04N 13/128* (2018.05); *H04N 13/239* (2018.05); *H04N 13/271* (2018.05); *G06T 2207/10012* (2013.01); *G06T 2207/10028* (2013.01)

(58) Field of Classification Search
CPC ... G06T 7/0008; G06T 7/0042; G06T 7/0085; G06T 7/408; G06T 7/60; G06T 2207/30108; G06T 2207/10028; G06K 9/4604; G06K 9/4652; G06K 9/52; H04N 2013/0081
See application file for complete search history.

(56) References Cited

U.S. PATENT DOCUMENTS

| | | | | |
|---|---|---|---|---|
| 4,890,053 A | * | 12/1989 | Banyasz | G07C 3/14 324/501 |
| 5,146,510 A | | 9/1992 | Cox et al. | |
| 5,165,101 A | | 11/1992 | Cox et al. | |
| 5,223,915 A | * | 6/1993 | Neri | A24C 5/3412 209/535 |
| 5,240,117 A | * | 8/1993 | Focke | B65B 19/28 198/626.1 |

(Continued)

FOREIGN PATENT DOCUMENTS

CN        202345943 U     7/2012

OTHER PUBLICATIONS

Internal Search Report of PCT/US2016/52090, dated Feb. 3, 2017; 3 pages.

*Primary Examiner* — Marnie A Matt
(74) *Attorney, Agent, or Firm* — Dentons US LLP

(57) ABSTRACT

A system and method may include determining a presence or absence of cigarettes in a set of cigarettes being processed by a cigarette packer machine by using at least one of a first image or a second image inclusive of the cigarettes in the set of cigarettes. A stereographic image may be produced using the first and second images. Determine level of tobacco of each cigarette of the set of cigarettes by using the first and second images. Produce a report in response to determining that a cigarette is not present or that a level of tobacco of a cigarette is outside of a specified level of tobacco of a cigarette.

20 Claims, 16 Drawing Sheets

(56) References Cited

U.S. PATENT DOCUMENTS

| | | | |
|---|---|---|---|
| 6,075,882 A | 6/2000 | Mullins et al. | |
| 6,373,520 B1 | 4/2002 | Cadieux, Jr. et al. | |
| 6,437,317 B1* | 8/2002 | Focke | A24C 5/3412 |
| | | | 250/221 |
| 6,531,693 B1* | 3/2003 | Focke | B65B 19/32 |
| | | | 209/535 |
| 7,779,846 B2 | 8/2010 | Apatafora et al. | |
| 8,442,304 B2 | 5/2013 | Marrion et al. | |
| 2004/0184031 A1* | 9/2004 | Vook | G06T 7/0002 |
| | | | 356/237.1 |
| 2006/0262293 A1 | 11/2006 | Sacher et al. | |
| 2010/0166294 A1 | 7/2010 | Marrion et al. | |
| 2012/0120229 A1 | 5/2012 | Brantley et al. | |
| 2013/0094705 A1 | 4/2013 | Tyagi et al. | |
| 2013/0287285 A1 | 10/2013 | Sato | |
| 2014/0226892 A1 | 8/2014 | Kral et al. | |
| 2015/0257437 A1* | 9/2015 | Wood | A24C 5/34 |
| | | | 348/125 |
| 2016/0253793 A1* | 9/2016 | Marrion | G06T 7/0008 |
| | | | 382/141 |

* cited by examiner

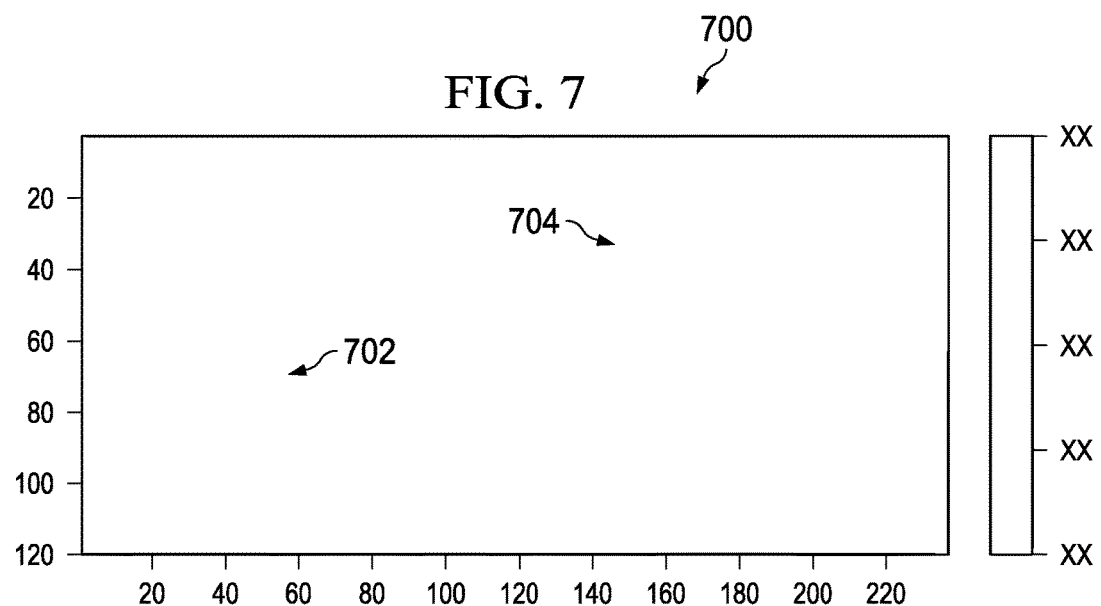
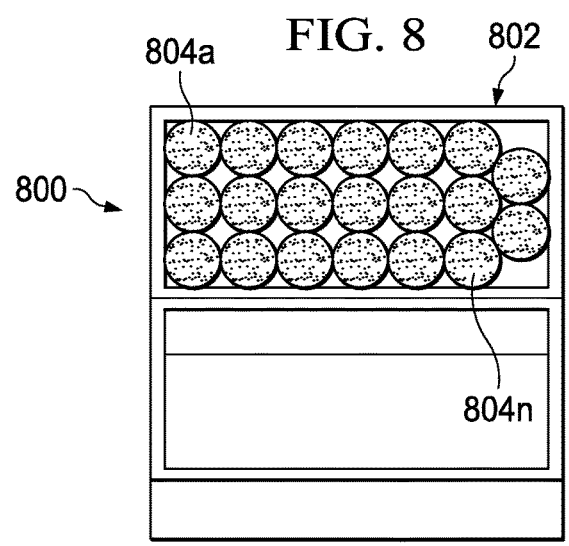

STEREOSCOPIC SYSTEM AND METHOD FOR QUALITY INSPECTION OF CIGARETTES IN CIGARETTE PACKER MACHINES

BACKGROUND

Cigarette packer machines include inspection systems to inspect tobacco level of each cigarette within packs of cigarettes and presence or absence of cigarettes within the packs of cigarettes. In inspecting the level of tobacco and presence or absence of cigarettes, a 3D inspection and 2D inspection have historically been respectively performed using a 3D imaging system and 2D imaging system.

Existing imaging systems for performing inspection of cigarettes in cigarette packer machines have included:

(i) two 3D inspection systems for each cigarette packer machine, including (a) a tobacco level inspection system, (b) a presence/absence of each cigarette inspection system, and/or (c) a filter presence/absence inspection system, and (ii) one 3D inspection system and one 2D inspection system, including (a) a 3D imaging system based on laser triangulation measurements for tobacco level inspection presence/absence check.

Problems with the use of a laser scanner used to perform laser triangulation for 3D inspection include:

(i) no visual 2D image is capable of being produced so a separate imaging system is needed to support filter presence or absence, (ii) laser scanners do not produce a visual output that is effective for visual inspection by an operator, (iii) laser scanners do not produce visual 2D images, so archiving for machine operation analysis and report generation is not possible, (iv) since 2D images are not available, cigarette locations are fixed such that small misalignment of the cigarettes results in false rejections;

(v) small occlusions in tobacco of the cigarettes result in false rejections;

(vi) additional processing systems may be required for laser scanners due to laser scanners collecting 8000 frames per second (fps) to create the 2D depth image; and (vii) laser scanners are impacted by safety rules to protect operators.

Accordingly, a cigarette inspection system that reduces or eliminates the shortcomings of existing cigarette inspection systems is needed.

SUMMARY

A stereoscopic cigarette inspection system that simultaneously provides for both 2D and 3D imaging may be utilized with cigarette packer systems to provide for a robust and high quality inspection of cigarettes. The stereoscopic cigarette inspection system may capture 2D images to provide for cigarette placement detection, filter presence or absence determination, and tobacco depth or level determination that overcome the shortcomings of existing cigarette inspection systems.

One embodiment of a cigarette inspection system may include a first imaging device configured to capture a first image of a set of cigarettes being inspected and a second imaging device configured to capture a second image of the set of cigarettes. The first and second imaging devices may be positioned to capture the first and second images capable of forming a stereoscopic image. A processing unit may be in communication with the first and second cameras, and may be configured to determine a presence or absence of cigarettes in the set of cigarettes by using at least one of the first image or second image, determine level of tobacco of each cigarette of the set of cigarettes by using the first and second images, and produce a report in response to determining that a cigarette is not present or that a level of tobacco of a cigarette is outside of a specified level of tobacco of a cigarette.

One embodiment of a method may include determining a presence or absence of cigarettes in a set of cigarettes being processed by a cigarette packer machine by using at least one of a first image or a second image inclusive of the cigarettes in the set of cigarettes. A stereographic image may be produced using the first and second images. Determine level of tobacco of each cigarette of the set of cigarettes by using the first and second images. Produce a report in response to determining that a cigarette is not present or that a level of tobacco of a cigarette is outside of a specified level of tobacco of a cigarette.

BRIEF DESCRIPTION OF THE DRAWINGS

Illustrative embodiments of the present invention are described in detail below with reference to the attached drawing figures, which are incorporated by reference herein and wherein:

FIG. 7 is an illustration of an illustrative 3D height map used for determining height of tobacco within individual cigarettes during an inspection process;

FIG. 8 is an illustration of an illustrative pack of cigarettes inclusive of multiple cigarettes captured in a 2D image during an inspection using a stereographic imaging device;

DETAILED DESCRIPTION OF THE DRAWINGS

Figure 1:
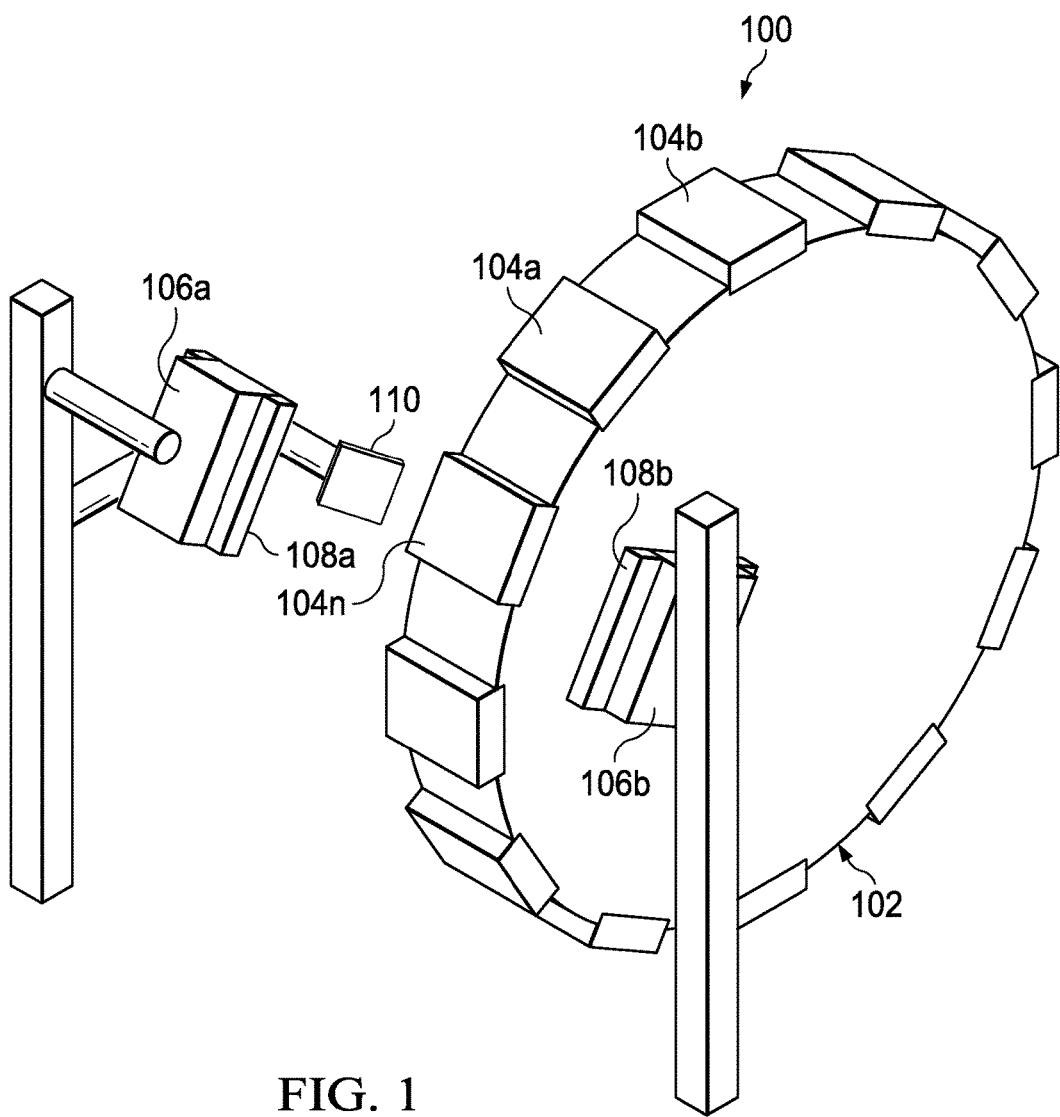
FIG. 1 is an illustration of an illustrative cigarette packer machine inclusive of a pair of stereographic imaging devices for imaging cigarettes being processed by the cigarette packer machine.

With regard to FIG. 1, an illustration of an illustrative cigarette packer machine 100 inclusive of a wheel 102 with multiple cigarette cartridges 104 disposed about the circumference of the wheel 102, and a pair of stereographic imaging devices 106a and 106b (collectively 106) for imaging cigarettes (not shown) being processed by the cigarette packer machine 100 is shown. In one embodiment, the two stereographic imaging devices 106 may be positioned to capture images of cigarettes on both sides of the cigarette cartridges 104. The stereographic imaging devices 106 are each configured with a pair of imaging paths (not shown) for capturing stereo graphic images, as understood in the art. The cameras 106 may include one or more optical sensors (not shown) in the pair of imaging paths that capture images in a 2-dimensional (2D) manner that, when combined, may form stereographic (3D) images. Although shown as a wheel, it should be understand that alternative configurations of the stereographic imaging devices 106 may be utilized with cigarette packer machines that utilize linear movement of cigarette packs or cartridges in which cigarettes are transported during processing.

In providing for proper illumination, each of the stereographic imaging devices 106 may be associated with one or more illumination devices 108a and 108b (collectively 108). In one embodiment, the illumination devices 108 may be configured as sets of multiple illumination devices. For example, the illumination devices 108a and 108b may respectively include green and blue light emitting diodes (LEDs), as further provided herein. Other configurations of illuminations devices 108, including using different colors, may be utilized.

Depending on the configuration of the cigarette packer machine 100, one or both of the stereographic imaging devices 106 may be positioned at a distance and/or orientation with respect to the cigarette cartridges 104 that does not support direct imaging of the cigarettes. As such, and as shown, a mirror 110 may be positioned and oriented between the imaging device 106a and the wheel 102 of the cigarette packer machine 100 to enable the stereographic imaging device 106a to capture images of the packs of cigarettes in the cigarette cartridge 104a.

Figure 2:
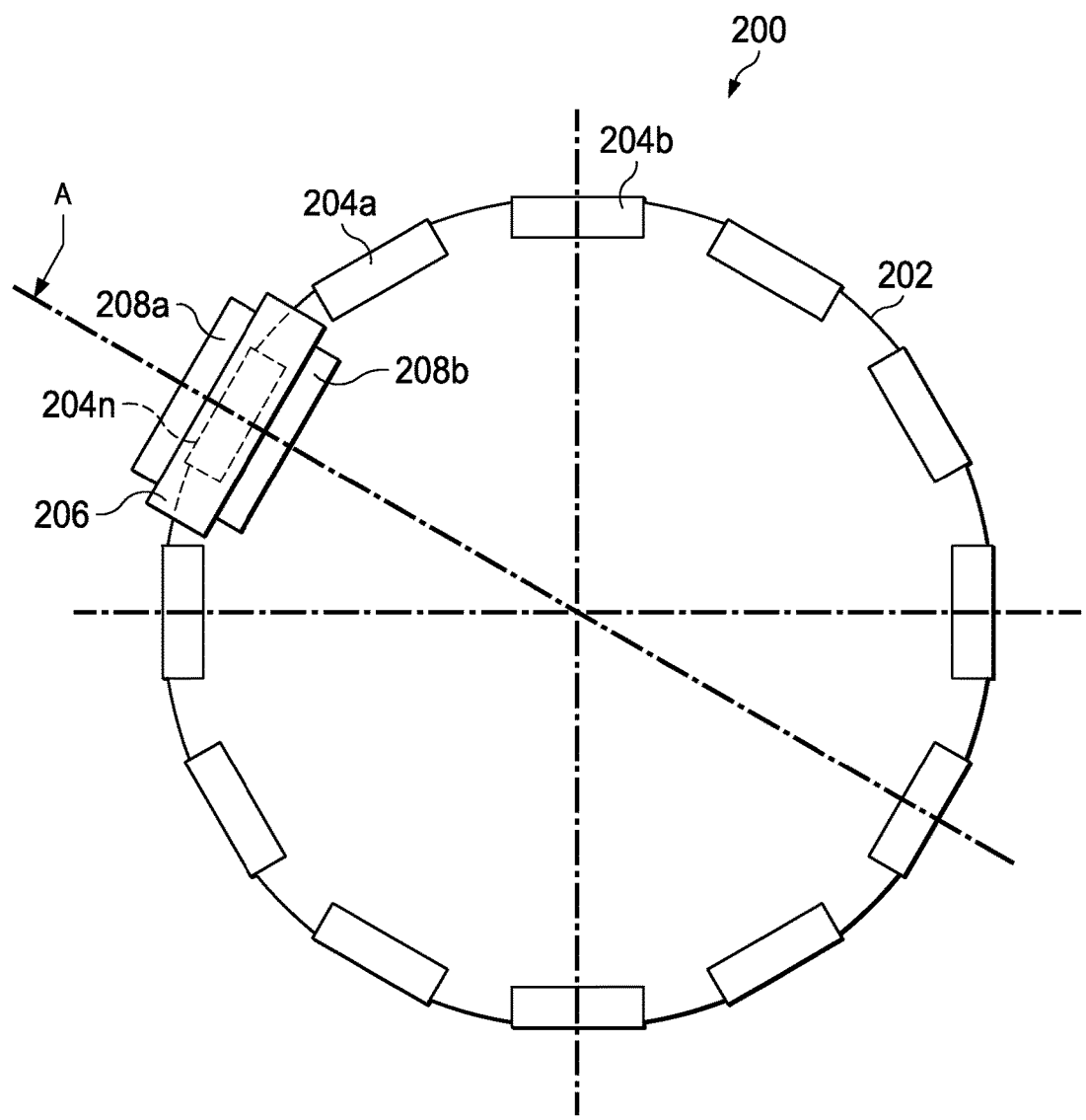
FIG. 2 is another illustration along an axial axis of an illustrative cigarette packer machine inclusive of a stereographic imaging device for imaging cigarettes being processed by the cigarette packer machine.

With regard to FIG. 2, another illustration along an axial axis of an illustrative cigarette packer machine 200 inclusive of a wheel 202 with cigarette cartridges 204a-204n (collectively 204) affixed thereto, and a stereographic imaging device 206 for imaging cigarettes being processed by the cigarette packer machine 200 is shown. The stereographic imaging device or 3D sensor 206 is shown to include a pair of lights 208a and 208b that directly illuminates cigarettes being processed in the cigarette cartridges 204. The 3D sensor 206 may be positioned and oriented axially with respect to the wheel 202 and cigarette cartridges 204 to enable the 3D sensor 206 to directly capture both 2D and 3D images of cigarettes being processed.

Figure 3A:
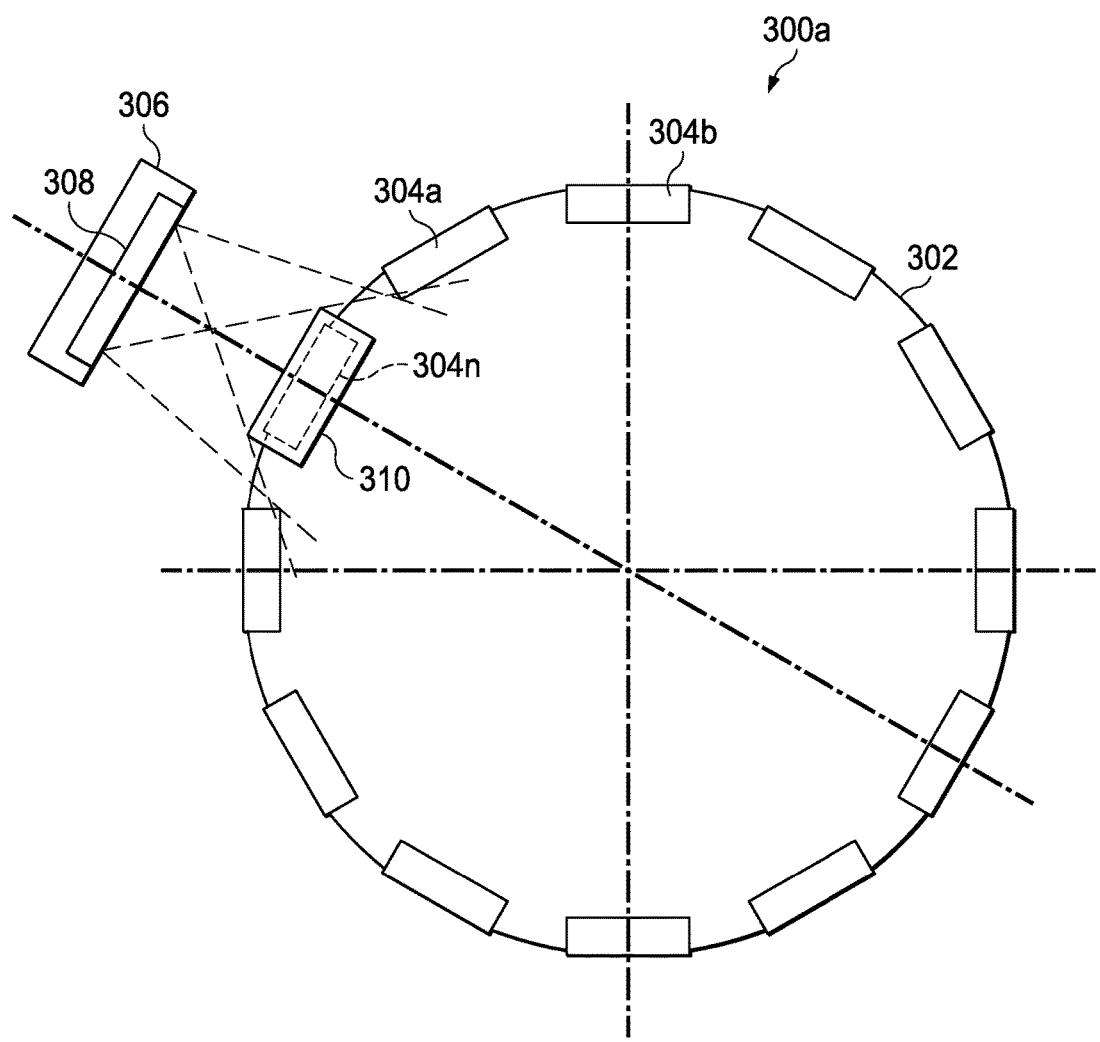
FIGS. 3A and 3B are illustrations along an axial axis and side view of an illustrative cigarette packer machine inclusive of a stereographic imaging device and mirror for imaging cigarettes being processed by the cigarette packer machine.
Figure 3B:
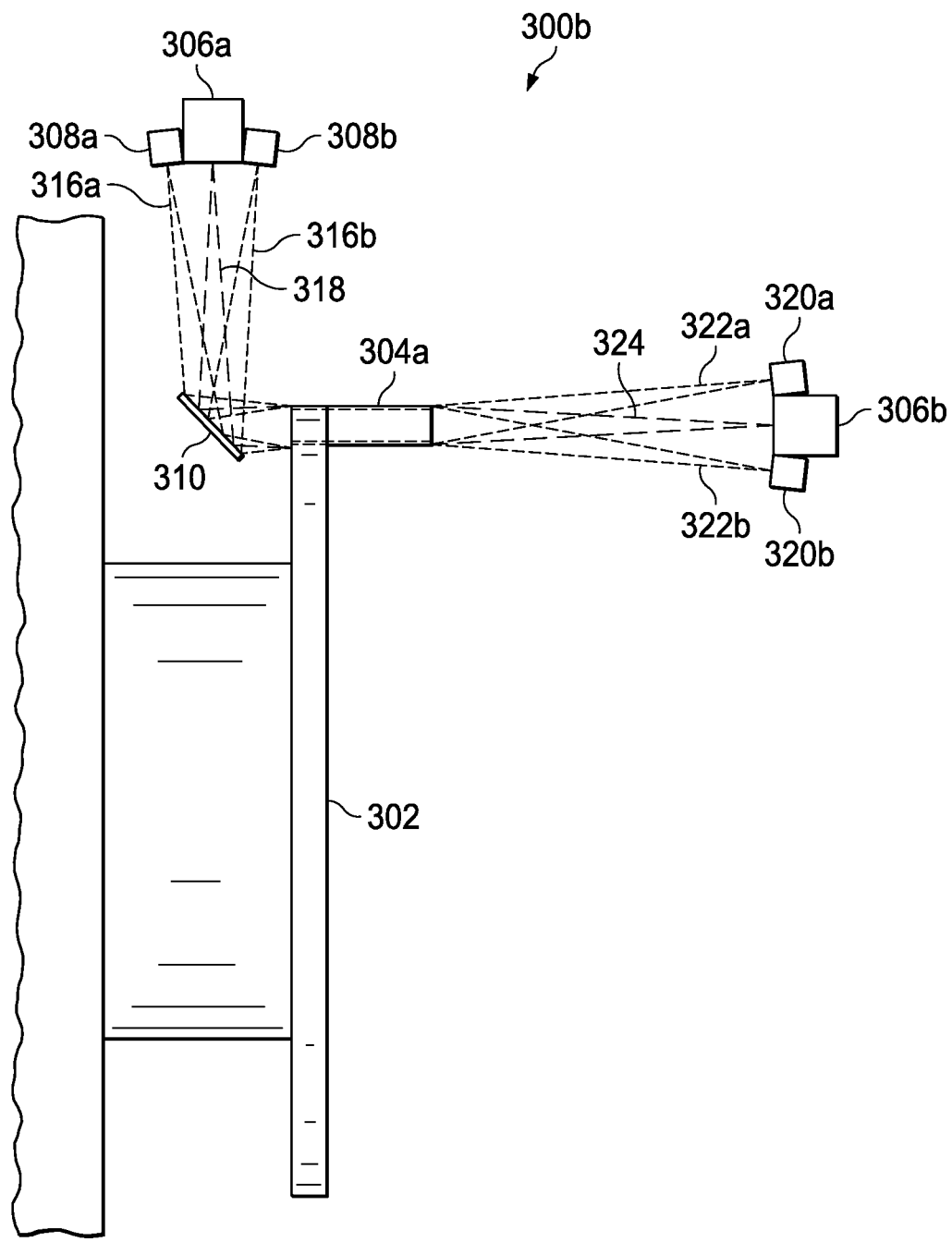

With regard to FIGS. 3A and 3B, illustrations along an axial axis and side view of an illustrative cigarette packer machine 300 inclusive of a wheel 302 and cigarette cartridges 304a-304n (collectively 304) along with a stereographic imaging device 306 with lights 308 and mirror 310 for imaging cigarettes being processed by the cigarette packer machine 300 are shown. The cigarette packer machine 300 may be configured with the lights 308 being oriented in the same direction of the 3D sensor 306. The 3D sensor 306 may be positioned and oriented to image cigarettes in the cigarette cartridges 304 via the mirror 310. The mirror 310 may be positioned and angled to enable light from the lights 308 and field-of-view (FOV) of the 3D sensor 306 to enable the lights 308 to reflect off of the mirror 310 to illuminate cigarettes in the cigarette cartridges 304 as the 3D sensor 306 images the cigarettes in the cigarette cartridges 304 via the mirror 310. Image paths 312a and 312b represent how each image sensor (not shown) of the 3D sensor 306 is oriented to image the cigarettes in the cigarette cartridges 304 via the mirror 310.

With regard to FIG. 3B, 3D sensor 306a is shown to be associated with lights 308a and 308b (collectively 308) being directed to the mirror 310, which reflects light beams 316a and 316b being illuminated by the lights 308 onto the cigarettes in the cigarette cartridge 304a so that images of the cigarettes in the cigarette cartridge 304a may be imaged by the 3D sensor 306a via image path 318. As shown, the image path 318 includes an image of the cigarette cartridge 304a that reflects off of the mirror 310. Similarly, 3D sensor 306b is associated with lights 320a and 320b that produce light beams 322a and 322b to illuminate cigarettes in the cigarette cartridge 304a. The 3D sensor 306b captures images within image path 324 to image the cigarettes in the cigarette cartridge 304a. The 3D sensors 306a and 306b collect 2D and 3D images of opposite ends of the cigarettes in the cigarette cartridge 304a.

Figure 4:
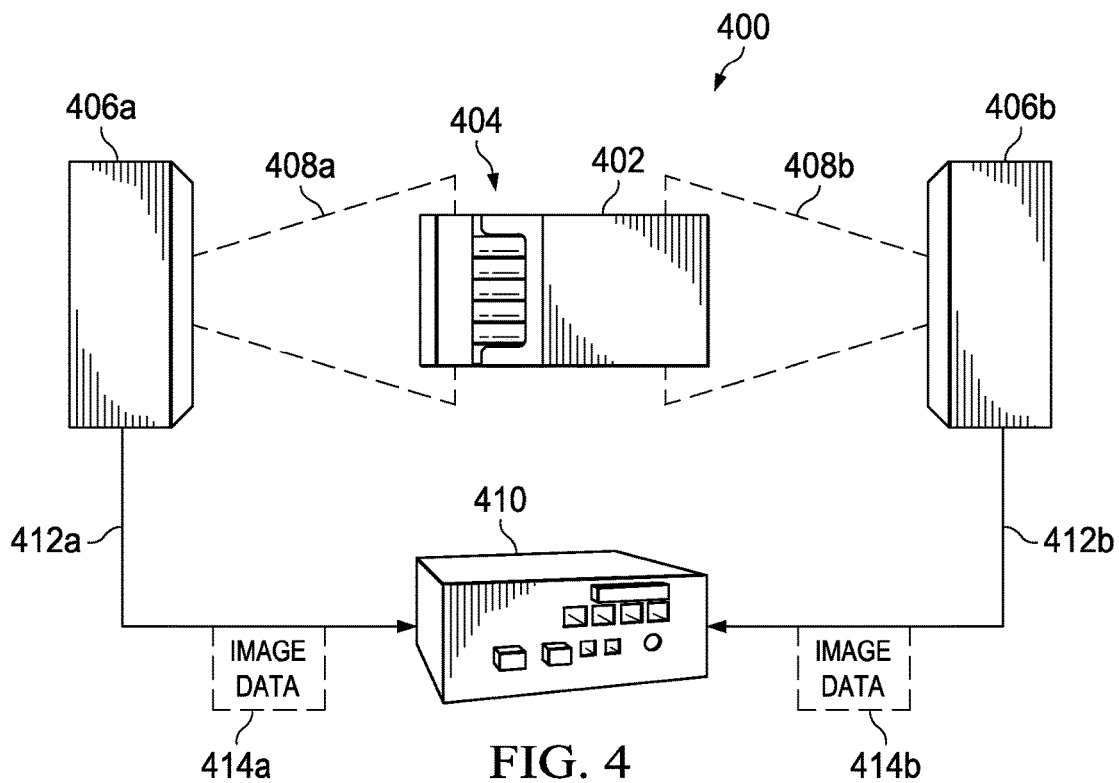
FIG. 4 is an illustration of an illustrative imaging setup inclusive of a pack of cigarettes and stereographic imaging devices (3D sensors) configured to image cigarettes in the pack of cigarettes and processing system for processing image data captured by the stereographic imaging devices.

With regard to FIG. 4, an illustration of an illustrative imaging setup 400 inclusive of a pack of cigarettes 402 inclusive of cigarettes 404, and stereographic imaging devices (3D sensors) 406a and 406b (collectively 406) configured to image cigarettes in the pack of cigarettes 402 and processing system for processing image data captured by the stereographic imaging devices 406 is shown. Image paths 408a and 408b (collectively 408) associated with the respective imaging devices 406 are used to capture images of the cigarettes 404. A processing device 410, which may include one or more processing units (not shown), may be in communication with the imaging devices 406 via communication paths 412a and 412b (collectively 412). The processing units may be signal processors, application specific integrated circuit(s) (ASICs), field programmable gate arrays (FPGAs), general processor(s), any processing unit configured top operate remotely, such as in the "cloud" or other network, combination thereof, or any other processing unit, as understood in the art, and may include software, firmware, or any other computer executable set of instructions for causing a processing unit to perform mathematical and/or logical processing as described herein. Image data 414a and 414b (collectively 414) may be communicated from the imaging devices 406 to the processing device 410 via the communication paths 412. The processing device 410 may process the image data 414 to determine that the pack of cigarettes 402 (or cigarette cartridge) is properly packed, and that each of the cigarettes 404 are properly oriented and are properly filled with tobacco to comply with a tobacco height specification, as understood in the art. The cigarettes in the cigarette cartridge or pack of cigarettes define a set of cigarettes that are processed by a cigarette packer machine and inspected by one or more stereoscopic imaging system.

Figure 5:
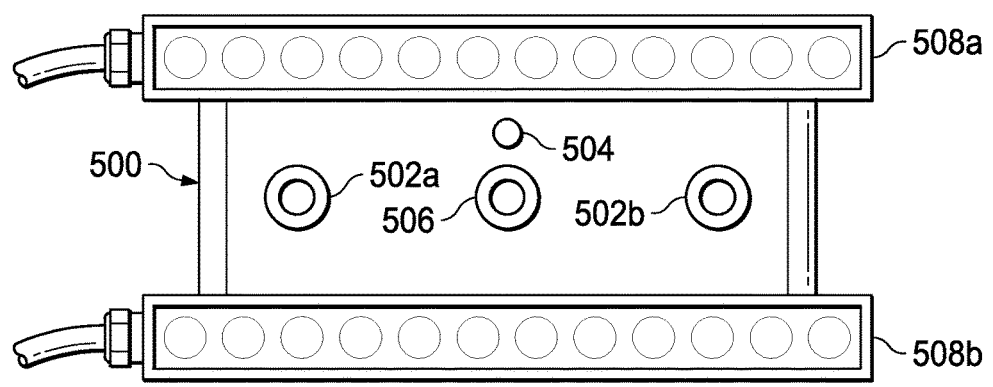
FIG. 5 is an illustration of an illustrative stereographic imaging device for use in capturing 3D images of cigarettes in any of the configurations of FIGS. 1-4.

With regard to FIG. 5, an illustration of an illustrative stereographic imaging device 500 for use in capturing 3D images of cigarettes in any of the configurations of FIGS. 1-4 is shown. The stereographic imaging device 500 is shown to include a pair of lenses 502a and 502b behind which imaging devices (not shown) may be positioned to capture images of packs of cigarettes or cigarettes in cigarette cartridges, for example. An infrared degraded LED light 504 may be configured to illuminate a field-of-view using an infrared light. An infrared pattern projector 506 may be configured to generate an infrared pattern on a region-of-interest (ROI), such as cigarettes in a cigarette cartridge, to cause a pattern to be projected thereon to assist image processing of a captured image of the region of interest. In the case of imaging tobacco contained within a cigarette, because the tobacco generally has irregular patterns, a pattern produced by the infrared pattern projector 506 may not be utilized when processing the tobacco of the cigarettes, but may be utilized when imaging other surfaces, such as a surface being used for calibration of the imaging devices of the imaging device 500. As further shown, two lights 508a and 508b (collectively 508) are shown to be inclusive of multiple LEDs, where the LEDs of the light 508a may be set at a first wavelength (e.g., green), and LEDs of light 508b may be set as a second wavelength (e.g., blue). It should be understood that the LEDs in the lights 508a and 508b may include LEDs of multiple wavelengths (e.g., alternating green and blue).

Figure 6:
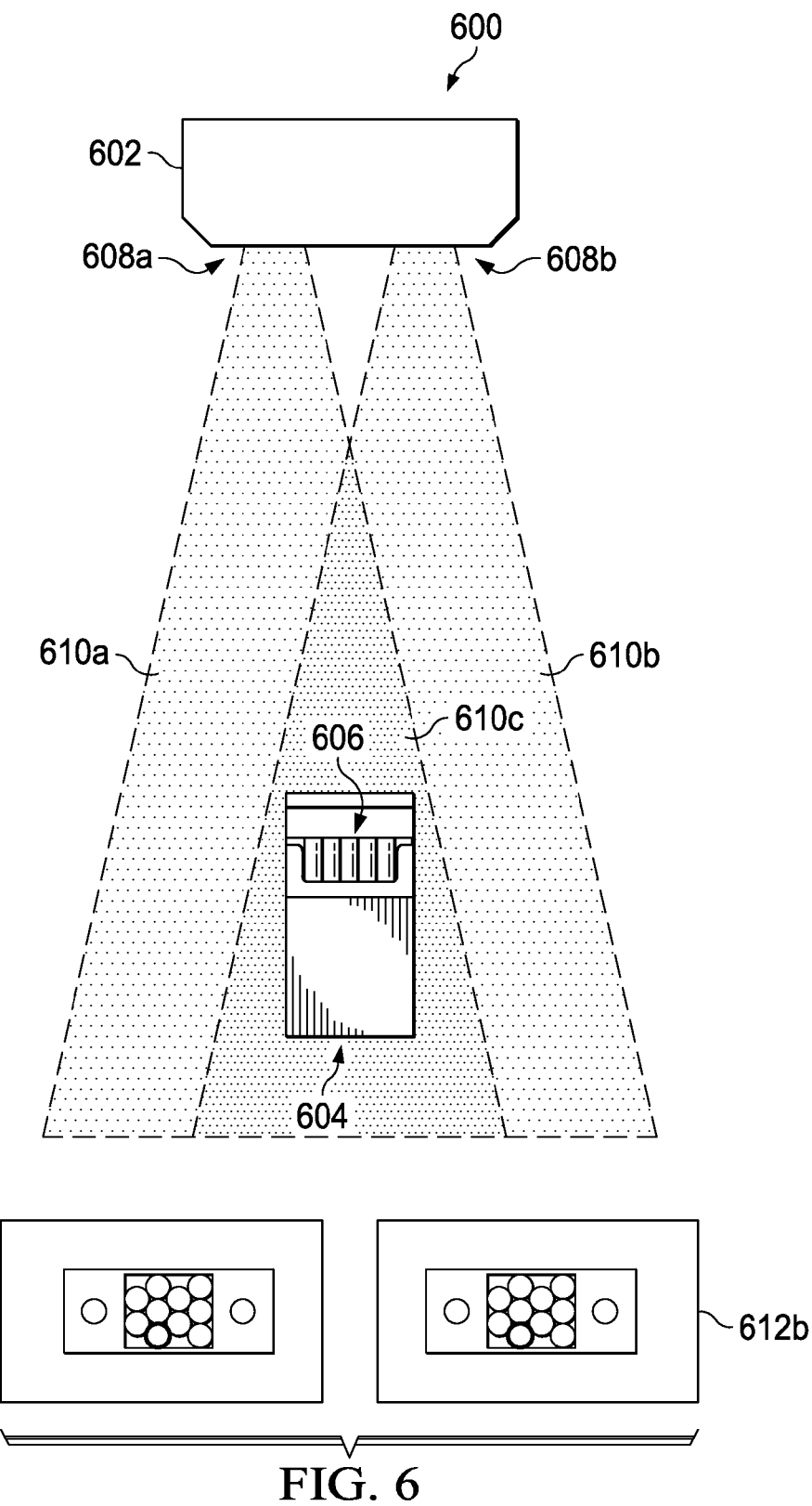
FIG. 6 is an illustration of a pack of cigarettes being imaged by an illustrative stereographic imaging device along with 2D images produced by each imaging device of the pair of imaging devices of the stereographic imaging device.

With regard to FIG. 6, an illustration of an imaging environment 600 inclusive of an illustrative stereographic imaging device 602 that images a pack of cigarettes or cigarette cartridge 604 inclusive of cigarettes 606 being imaged by a pair of imaging devices 608a and 608b having imaging paths 610a and 610b is shown. The imaging paths 610a and 610b are shown to overlap to form a combined imaging path 610c that enables for a stereoscopic image of the cigarettes 606 to be produced. Images 612a and 612b are 2D images captured from each of the imaging devices 608a and 608b, respectively. At least one of the images 612a and 612b may be used to perform an inspection of the cigarettes for presence and location, optionally including filter presence/absence, and a combined 3D image (not shown) produced by the images 612a and 612b may be used for inspecting level of tobacco of the individual cigarettes 606. In determining location, the location or alignment accuracy may be determined with a high-degree of accuracy (e.g., at the imaging accuracy of the imaging devices 608). The position of the cigarettes may be determined within predetermined boundaries using a 2D image. From locating the cigarettes, 3D depth maps may be produced that corresponds depth values to measured locations of each of the cigarettes using the pixels of the 2D image. It should be understood that the 2D and 3D images may be used in combination by the imaging system so as to provide improved performance with reduced memory and computations than existing systems.

With regard to FIG. 7, an illustration of an illustrative 3D height or depth map 700 used for determining height of tobacco within individual cigarettes during an inspection process is shown. The 3D height map 700 provides for a first color (e.g., dark color) 702 to indicate where an object is close to an imaging device and a second color (e.g., bright color) 704 to indicate where an object is farther from the imaging device. The 3D height map 700 utilizes 3D data values from a pair of 2D images that are aligned to form a 3D image from a stereographic imaging device. The pair of 2D images may be simultaneously captured. Alignment of the images may be performed using a variety of manual and/or automated techniques. For example, a common reference plane or other indicia may be used to horizontally align images captured by individual cameras of the stereographic imaging device. In one embodiment, a tridimensional measure of objects in a field-of-view may be obtained by applying triangulation algorithms on the two images, where a depth Z may be determined by the following equation, $Z=(-F*B)/D$, where F is focal length of an imaging device, B is baseline (e.g., distance between a pair of imaging devices of a stereographic imaging device, and D is disparity. A 3D point cloud, which represents a set of points in a 3D coordinate system, representative of real points on the object surface, may be calculated from the first and second images for each of the cigarettes. Level of tobacco of each cigarette may be performed at each point with the 3D point cloud that corresponds to a 2D pixel from one of the images.

With regard to FIG. 8, an illustration of an illustrative pack of cigarettes or cigarette cartridge 802 inclusive of multiple cigarettes 804a-804n (collectively 804) captured in a 2D image during an inspection using a stereographic imaging device is shown. The 2D image allows for an inspection system to identify locations and orientations of the cigarettes in the pack of cigarettes 802, as further described herein.

Figure 9:
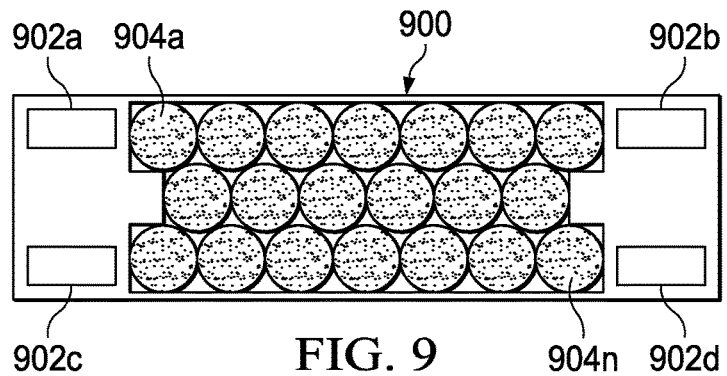
FIG. 9 is an illustration of an illustrative cigarette cartridge on which reference regions are defined to enable an inspection system to verify a level of tobacco in each cigarette with respect to the reference planes.

With regard to FIG. 9, an illustration of an illustrative cigarette cartridge 900 on which reference regions 902a-902b (collectively 902) are defined to enable an inspection system to verify a level of tobacco in each cigarette 904a-904n (collectively 904) with respect to the reference regions 902 is shown. The reference regions 902 are used to determine a reference plane from which distance of each 3D point or average or mean of the 3D points) measured from each of the cigarettes 904 may be computed. A determination may be made based on the 3D point measurements whether a cigarette is to be rejected or not. For example, if a tobacco level of a cigarette is determined to be too low, the cigarette is rejected, and if the tobacco level is within a normal range, then the cigarette is not rejected. The reference regions 902 are shown to be flat surfaces of the cigarette cartridge 900 into which cigarettes are pushed into by the cigarette packer machine. Given 3D points selected by those regions 902, a plane that best fits the distribution of points may be determined and stored as the reference plane.

Figure 10:
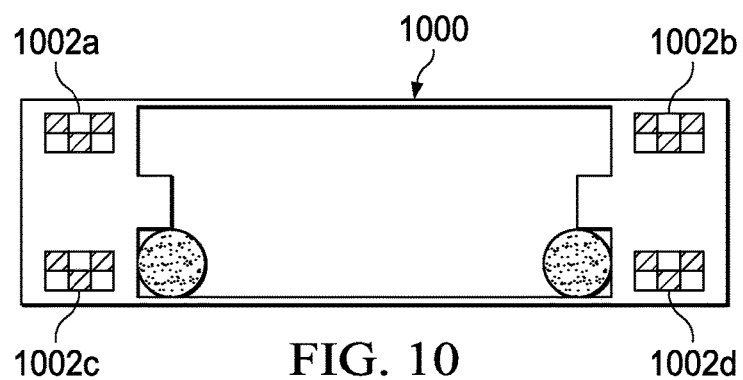
FIG. 10 is an illustration of a cigarette cartridge on which alternative reference regions inclusive of texture may be defined to enable an inspection system to verify a level of tobacco in each cigarette with respect to the reference regions.

With regard to FIG. 10, an illustration of a cigarette cartridge 1000 on which alternative reference regions 1002a-1002n (collectively 1002) inclusive of texture may be defined to enable a 3D inspection system to verify a level of tobacco in each cigarette with respect to the reference regions 1002 is shown. In this case, the texture is shown to be alternating patterns of black and white random patches. It should be understood that alternative textures may be utilized. Based on distances of the reference regions 1002 from imaging devices, a reference plane may be computed for use in determining height of tobacco and cigarettes that are positioned within the cigarette cartridge 1000 during an inspection process. Because the reference plane accuracy may be limited due to the front side of the cartridge 1000 not having an accurate mechanical relationship to positioning of the cigarettes, the use of the reference plane as determined by the reference regions may be limited, and a more accurate reference plane technique may be provided by an alternative configuration of FIG. 11.

Figure 11:
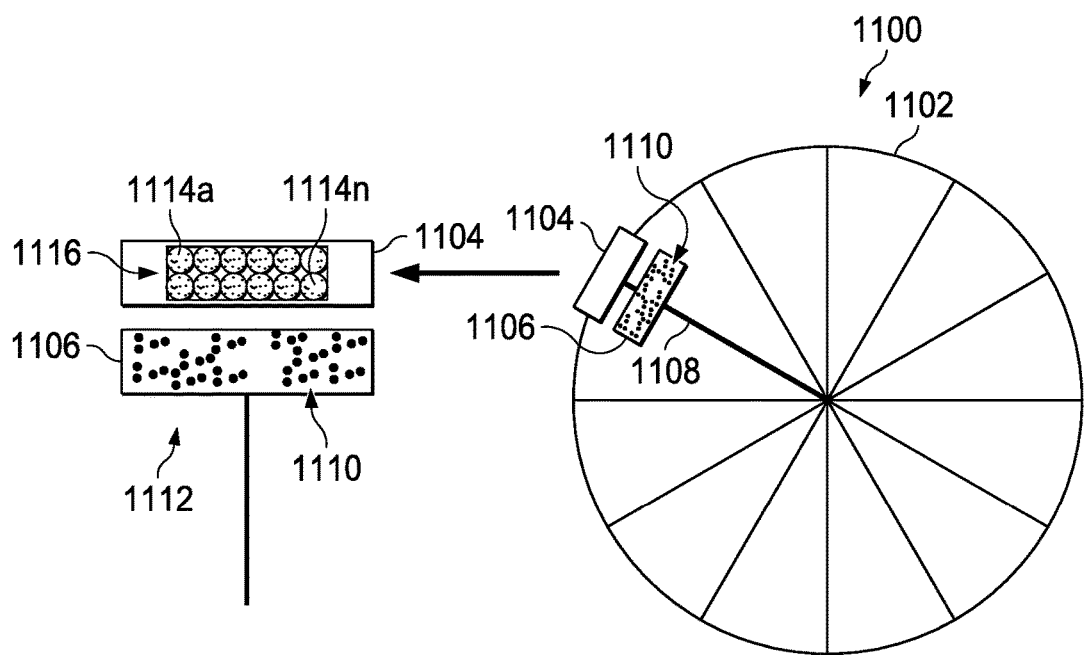
FIG. 11 is an illustration of an alternative embodiment inclusive of a cigarette cartridge along with a reference plane disposed radially inward from the cigarette cartridge to be used for calibration during or between inspection processes.

With regard to FIG. 11, an illustration of a cigarette packer machine 1100 inclusive of a wheel 1102 on which a cigarette cartridge 1104 is positioned along with a reference plate 1106 being disposed radially inward along a spoke 1108 or other member of the wheel 1102 from the cigarette cartridge 1104 to be used for calibration during or between inspection processes is shown. As shown, the reference plate 1106 includes a pattern of dots or other markings 1110 that allows for an imaging device to better image the reference plate 1106 and a computing device to more easily determine distance of the reference plate 1106. In operation, the reference plate 1106 is to be imaged and used for computing depth distance of tobacco in cigarettes during inspection of the cigarettes. The reference plate 1106 may be configured such that the reference plate 1106 is positioned along the same plane 1112 as the ends 1114a-1114n (collectively 1114) of the cigarettes 1116 that are positioned within the cigarette cartridge 1104. It should be understood that the ends 1114 of the cigarettes 1116 may be the filtered end or the tobacco end, and that both ends of the cigarettes 1116 may utilize a reference plate 1106 for 3D measurements.

A variety of techniques may be utilized to establish and use a reference plane, including defining multiple reference planes depending on the precision of the wheel movement. In one embodiment, a single reference point for each cigarette cartridge may be established during a training phase. Alternatively, one reference plane for each cigarette cartridge may be defined during a training phase by measuring a reference plate associated with each cigarette cartridge. Still yet, a processing unit may be configured to automatically determine a reference plane by locating a reference plate associated with one or more cigarette cartridges, where the determination may be performed during runtime or between inspections. In one embodiment, a process for auto-selecting a reference plane may be performed by locating a fixed reference plate using pattern matching or a line finding algorithm on a 2D image, or by using a blob analysis on a depth map, as understood in the art. A region-of-interest may be automatically placed based on the located reference plate and a reference plane may be fit on the 3D points corresponding to the 2D pixels within the region-of-interest.

As understood, acceleration and de-acceleration of the cigarettes during indexed move of the wheel may cause cigarettes to move inside the cigarette cartridge. As cigarettes move away from their ideal position (i.e., fill format), depth measurement may be performed in the wrong position. To address such movement of cigarettes, one aspect provides for identifying a white contrasting paper wrap against the brown color of tobacco in the white paper wrap. Typical paper wrap thickness is 0.1 mm, so identification can be difficult. Infrared (IR) lights and red lights remove color information in the image, so there is no contrast between the paper and tobacco. One embodiment may include the use of different color lights that create a contrast between the white wrap paper and the tobacco. The different color lights may be blue and green LED lights that provide a contrast between the wrap paper and tobacco. It is contemplate that lights that provide for better identification of the wrap paper and tobacco may be alternatively used (e.g., blue and green lights to image the white paper and then IR and/or red lights to image the tobacco). The blue light may be an AI LLS806-470 LED line light, 400 microsec strobe light, and the green light may be green AI LLS806-530 LED line light 400 microsec strobe light. Alternative light configurations and/or wavelengths may be utilized. In operation, reference plane detection for the stereographic imaging device may be performed by using infrared (IR) and then visible light (e.g., blue and green either simultaneously or strobed in succession and the images aligned) to identify the paper wrap, as further described herein.

Figure 12:
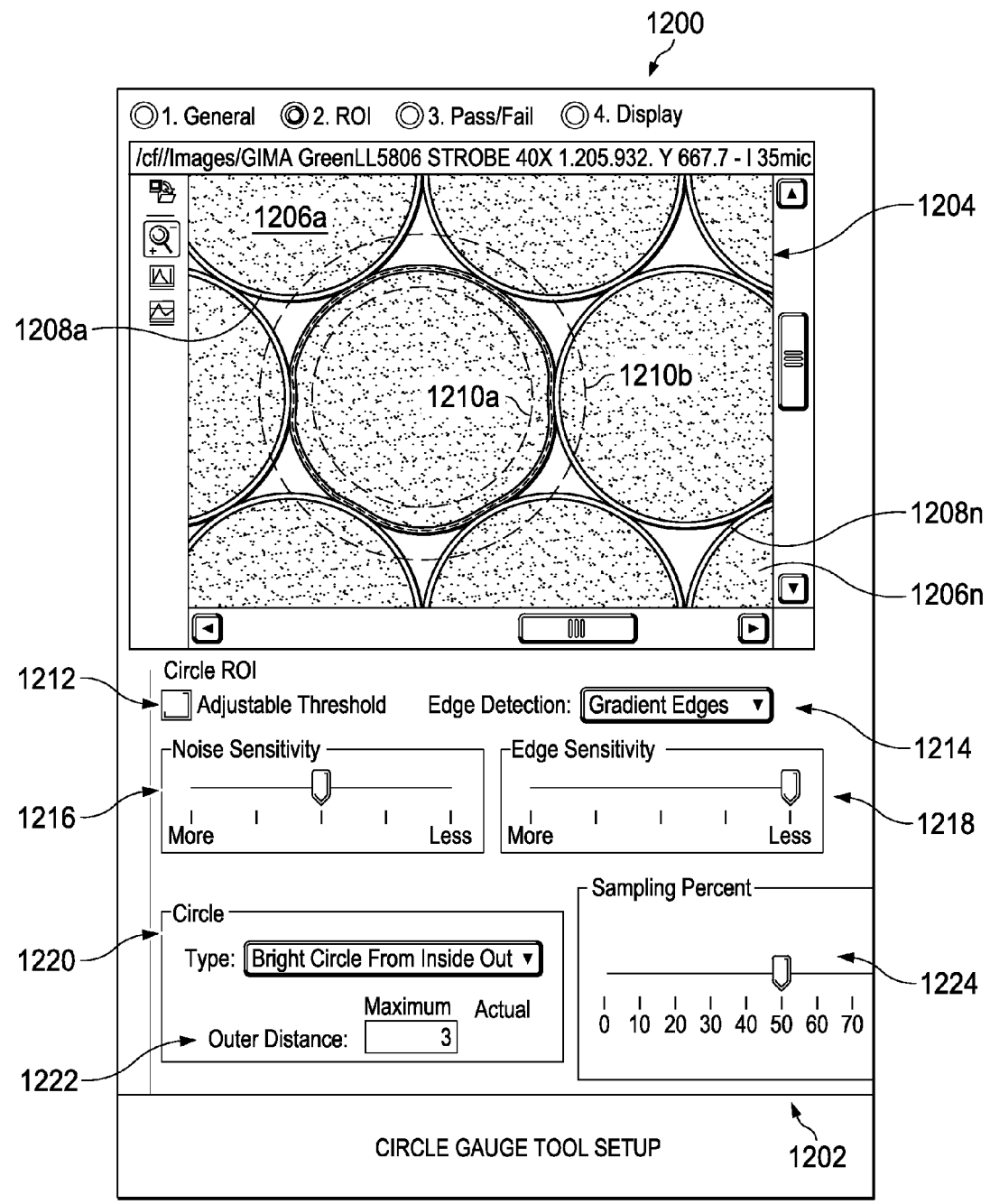
FIG. 12 is a screenshot of an illustrative user interface that provides for a setup screen for a circle gauge tool that may be utilized for processing an image inclusive of cigarettes with cigarette paper that encircle tobacco of the cigarettes during an inspection process.

With regard to FIG. 12, a screenshot of an illustrative user interface 1200 that provides for a setup screen 1202 for a circle gauge tool that may be utilized for processing an image 1204 inclusive of cigarettes 1206a-1206n (collectively 1206) with cigarette paper 1208a-1208n (collectively 1208) that encircle tobacco of the cigarettes 1206 during an inspection process is shown. As understood, cigarettes in the cigarette cartridge shift such that inspection of the cigarettes are to have some level of flexibility. The user interface circle gauge tool enables a user to specify certain parameters, such as diameter range between a minimum diameter range 1210a and maximum diameter range 1210b that may be used to define minimum and maximum ranges in which the cigarette paper 1208 may be positioned for dynamic location of cigarettes by the circle gauge tool. It should be understood that the image 1204 is zoomed in to assist a user with establishing the minimum and maximum diameter ranges 1210a and 1210b, and that alternative zoom levels may be utilized.

In one embodiment, the minimum and maximum diameter ranges 1210a and 1210b may be automatically established by the circle gauge tool by identifying the cigarette paper 1208 and setting predetermined minimum and maximum diameter ranges 1210a and 1210b about the cigarette paper 1208. As further shown, a number of circle region-of-interest settings may include an adjustable threshold setting that may be turned on with a selection element 1212 to allow\ a user to select an edge detection type using a selection element 1214 (e.g., gradient edges), noise sensitivity setting element 1216, edge sensitivity setting element 1218, circle type selection element 1220 (e.g., bright circle from inside out) with an outer distance maximum setting 1222, and sampling percent selection element 1224. It should be understood that alternative and/or additional settings for defining locations of circles that define ranges in which cigarettes may be positioned along with techniques for identifying cigarette paper 1208 of the cigarettes 1206 may be utilized by the circle gauge tool.

Figure 13:
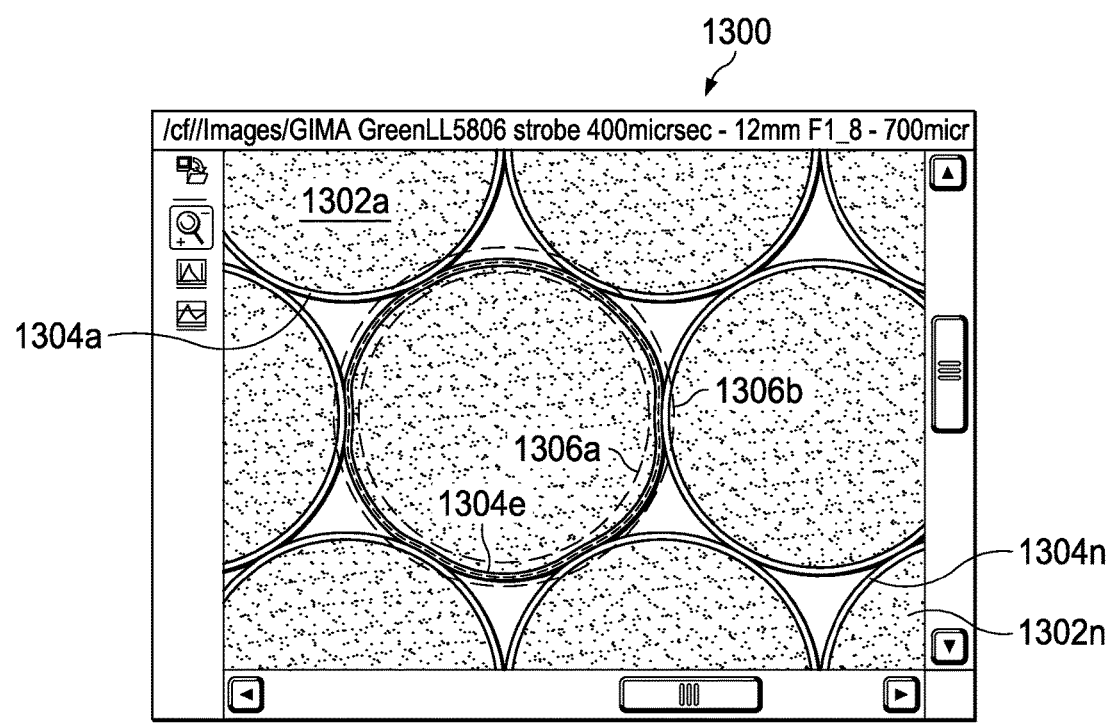
FIG. 13 is a screen shot of a user interface inclusive of an illustrative image of cigarettes in which the minimum and maximum diameter ranges established by the circle gauge tool of FIG. 12 is utilized to determine locations of cigarette paper.

With regard to FIG. 13, a screen shot of a user interface 1300 inclusive of an illustrative image of cigarettes 1302a-1302n (collectively 1302) in which the minimum and maximum diameter ranges established by the circle gauge tool of FIG. 12 is utilized to determine locations of cigarette paper 1304a-1304n (collectively 1304) is shown. The image of cigarettes 1302 includes an inside diameter range 1306a and outside diameter range 1306b (collectively 1306) around cigarette paper 1304e that is determined from the circle ROI settings established in the circle gauge tool of FIG. 12. That is, the distance of the inside and outside diameter ranges 1306a and 1306b from the cigarette paper 1304e may vary based on the settings established in the circle gauge tool setup user interface 1200 of FIG. 12. The use of the minimum and maximum diameter ranges 1210a and 1210b of FIG. 12 may be used to form an initial approximation of the cigarette paper 1304 of the cigarettes 1302, thereby enabling the inside and outside diameter ranges 1306 from the cigarette paper 1304e to be more quickly determined. By identifying the cigarette paper 1304 for each of the cigarettes 1302, inspection of the cigarettes 1302 may be performed using 2D and 3D image processing, as described herein.

Although the embodiments of the stereographic imaging and inspection system described herein are particularly focused on inspection of cigarettes, it should be understood that the stereographic imaging and inspection system that captures and utilizes a combination of 2D and 3D imaging features during the inspection process may be applied to objects being inspected other than cigarettes. That is, by utilizing a stereographic imaging and inspection system that combines 2D and 3D imaging, less costly and more efficient inspections may be performed.

Figure 14:
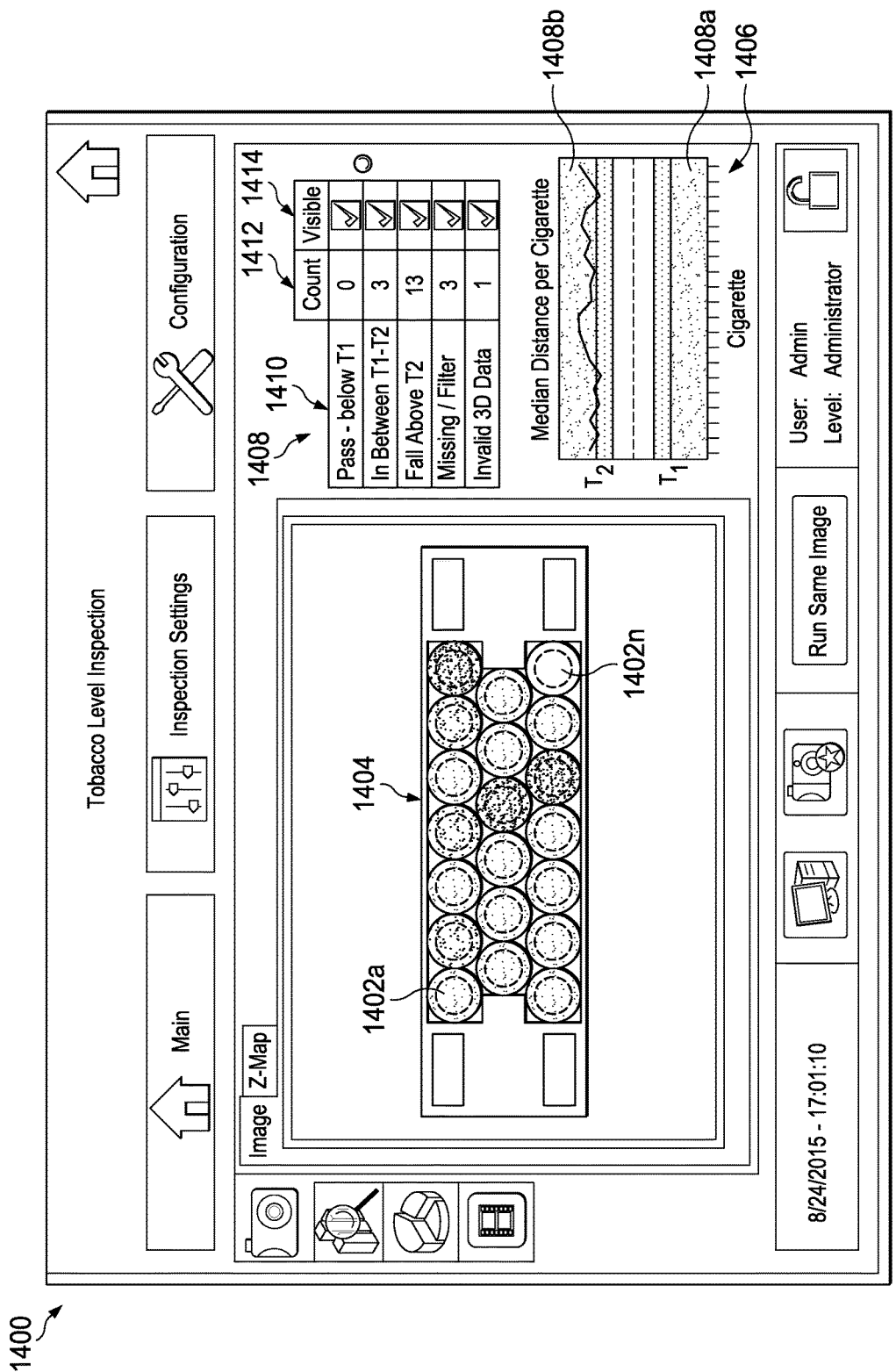
FIG. 14 is a screen shot of an illustrative tobacco level inspection tool user interface that identifies cigarettes in a cigarette cartridge along with median distances of the cigarettes utilizing 3D imaging as described herein.

With regard to FIG. 14, a screen shot of an illustrative tobacco level inspection tool user interface 1400 that identifies cigarettes 1402a-1402n (collectively 1402) in a cigarette cartridge 1404 along with median distances (e.g., in millimeters) of the cigarettes utilizing 3D imaging as described herein is shown. The median distance or other mathematical metric per cigarette is a median distance of tobacco measured using 3D measurements, and shown in an illustrative graph 1406. In one embodiment, the cigarettes 1402 are superimposed with a grayscale or color image that is indicative of the median distance per cigarette (e.g., light is closer and dark is farther from the imaging device). In an alternative embodiment, the inspection tool may superimpose colors on the cigarettes, such as red for fail, yellow for close to failing, white for ideal, blue for missing or filter showing, and black for faulty 3D data. The graph 1406 is shown with a minimum threshold level 1408a and maximum threshold level 1408b below and above which cigarettes are determined to be out of compliance, and between which, determined to be in compliance.

In one embodiment, a cigarette measured parameters list 1408 may provide for various parameter measurements 1410, including cigarettes below a minimum threshold level (T1) 1408a, cigarettes between a minimum threshold level (T1) 1408a and maximum threshold level (T2) 1408b, cigarettes above a maximum threshold level (T2) 1408b, missing cigarette or filter showing, and invalid 3D data. Count values 1412 for each of the parameter measurements 1410 as shown, and indicate that no cigarettes 1402 were measured below the minimum threshold level (T1) 1408a, 3 cigarettes were measured between the minimum and maximum threshold levels 1408a and 1408b, 13 cigarettes were above the maximum threshold level 1408b, 3 cigarettes (in the top row) were determined to be missing or the filter side of the cigarette was showing, and 1 cigarette (in the middle row) was measured with invalid 3D data. A user may select using selection elements 1414 to display superimposed colors or other indicia, for example, on the inspected cigarettes to show which of the cigarettes were determined to be within the parameter measurements 1410. In the case of inspecting the filter end of the cigarettes, a parameter indicative of the filters being present/absent and properly configured may be provided, as well.

Figure 15:
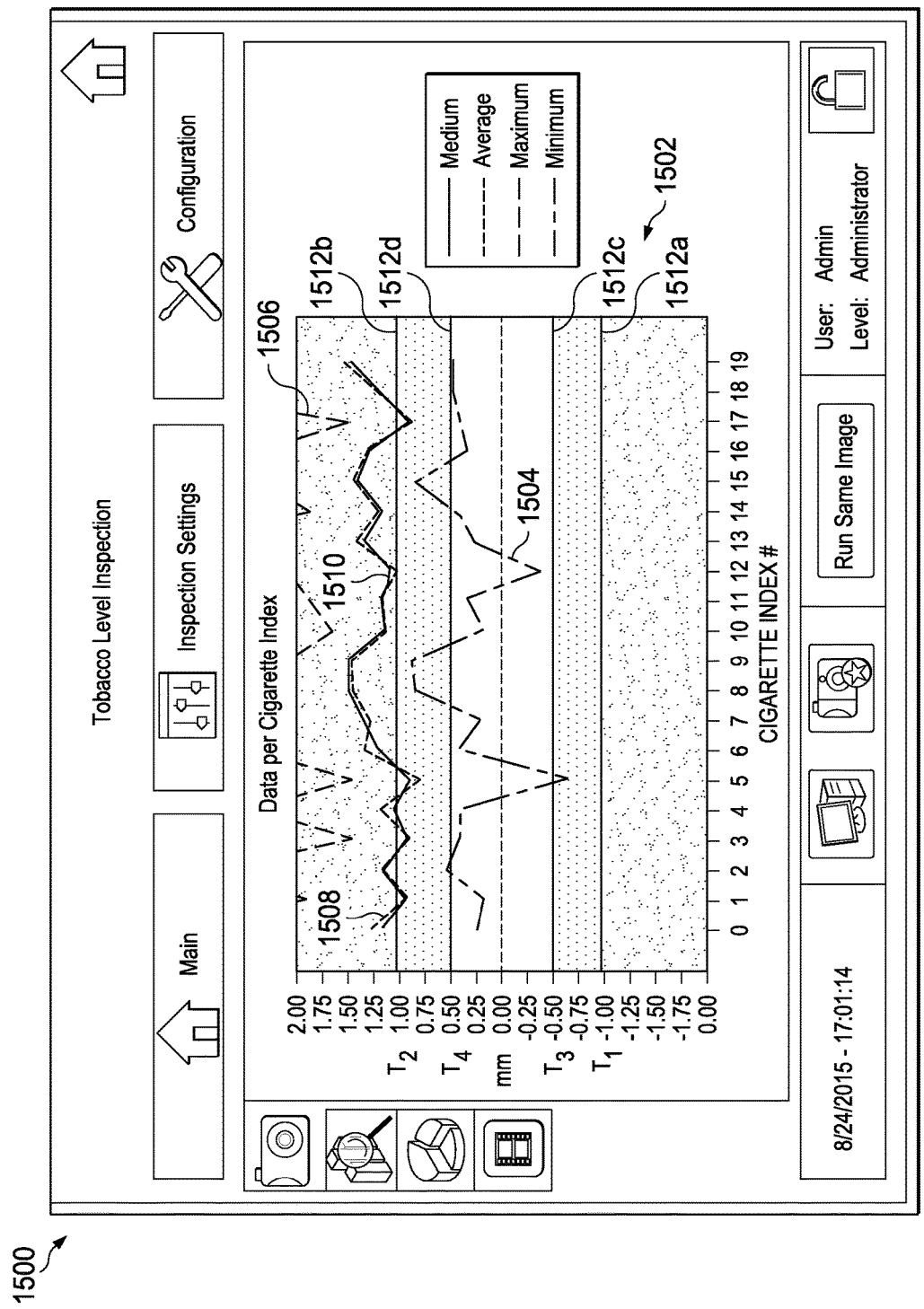
FIG. 15 is a screen shot of an illustrative tobacco level inspection tool user interface in which a graph shows height of tobacco of each cigarette using 3D imaging.

With regard to FIG. 15, a screen shot of an illustrative tobacco level inspection tool user interface 1500 in which a graph 1502 shows height of tobacco of each cigarette using 3D imaging is shown. For each cigarette, the computed tobacco level (in mm) is displayed. Curves inclusive of values of each cigarette are displayed on the graph 1502, including a minimum value curve 1504, maximum value curve 1506, average value curve 1508, and median value curve 1510. Because tobacco within a cigarette is not smooth (e.g., occlusions in the tobacco) as measured at the end of each cigarette, measured values can vary to provide for the wide difference in minimum and maximum values of each cigarette. In one embodiment, red or other colored regions below a minimum threshold value (T1) 1512a and above a maximum threshold value (T2) 1512b correspond to outer tolerances, wherein if a median or average cigarette level is determined to be within either of these regions, a cigarette (or pack of cigarettes) is always determined to be a defect. A yellow or other color region may be established between threshold levels 1512a/1512c and 1512b/1512d, and correspond to be an inner tolerance that defines a minor defect, where an overall product (e.g., pack of cigarettes) is determined to be a defect if enough minor defects (e.g., greater than 50% of the cigarettes in the cigarette cartridge) are detected.

Figure 16:
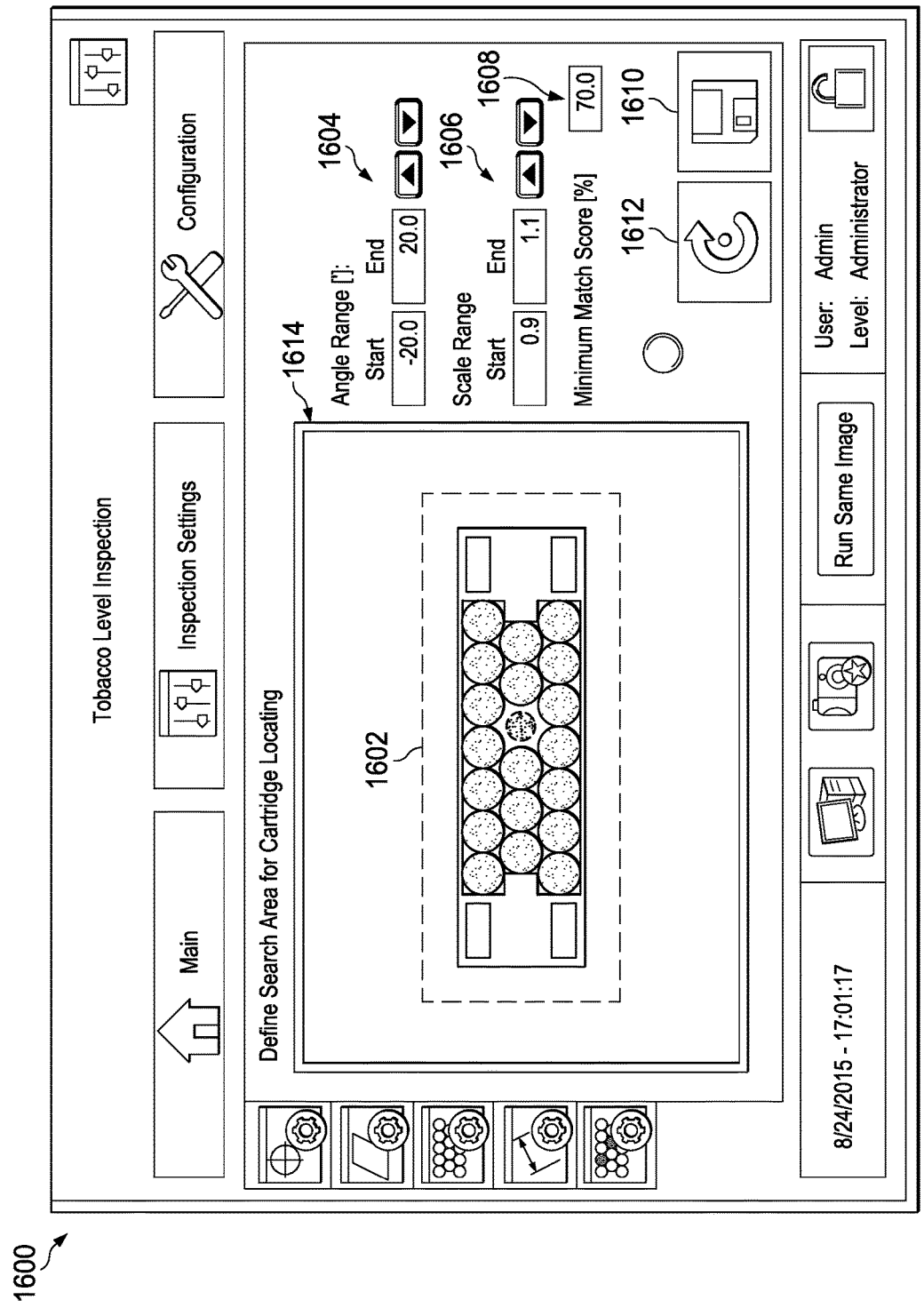
FIG. 16 is a screen shot of an illustrative tobacco level inspection tool user interface in which a user may define a search area for locating a cigarette cartridge in setting up the tobacco level inspection tool.

With regard to FIG. 16, a screen shot of an illustrative tobacco level inspection tool user interface 1600 in which a user may define a search area for locating a cigarette cartridge in setting up the tobacco level inspection tool is shown. The user interface 1600 allows the user to define a tobacco expected reference plane ROI 1602. Reference plane search parameters, including angle range 1604, scale range 1606, and minimum match score 1608, may also be modified. A "save" soft-button 1610 may allow a user to save current search parameters. A circular arrow soft-button 1612 may cause the inspection tool to run a current configuration on an image 1614.

Figure 17:
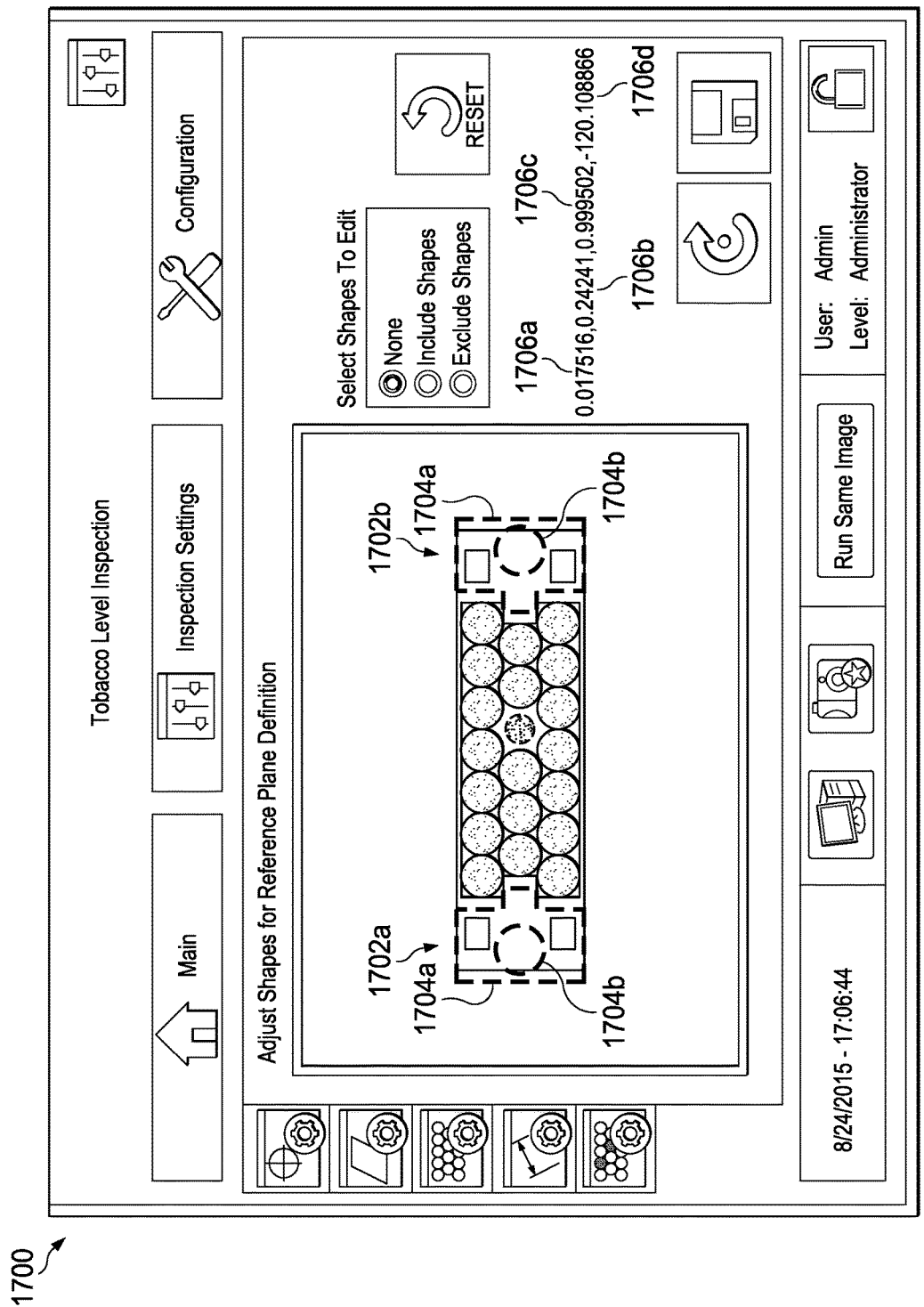
FIG. 17 is a screen shot of an illustrative tobacco level inspection tool user interface in which a user may adjust shapes for defining one or more reference planes used by a processing system in determining height of tobacco of cigarettes.

With regard to FIG. 17, a screen shot of an illustrative tobacco level inspection tool user interface 1700 in which a user may adjust shapes for defining one or more reference planes used by a processing system in determining height of tobacco of cigarettes is shown. Shapes 1702a and 1702b for reference plane detection may first be loaded from a CAD file, although a user may modify the shapes in order to achieve a better fitting. A plane fitting algorithm may fit a plane using 3D points that are inside shapes 1704a, while excludes points that are inside shapes 1704b. For each fitted plane, the plane parameters may be displayed in millimeters (mm), where values 1706a-1706c are the plane normal coordinates, and the last value 1706d is the plane distance with respect to a system origin.

Figure 18:
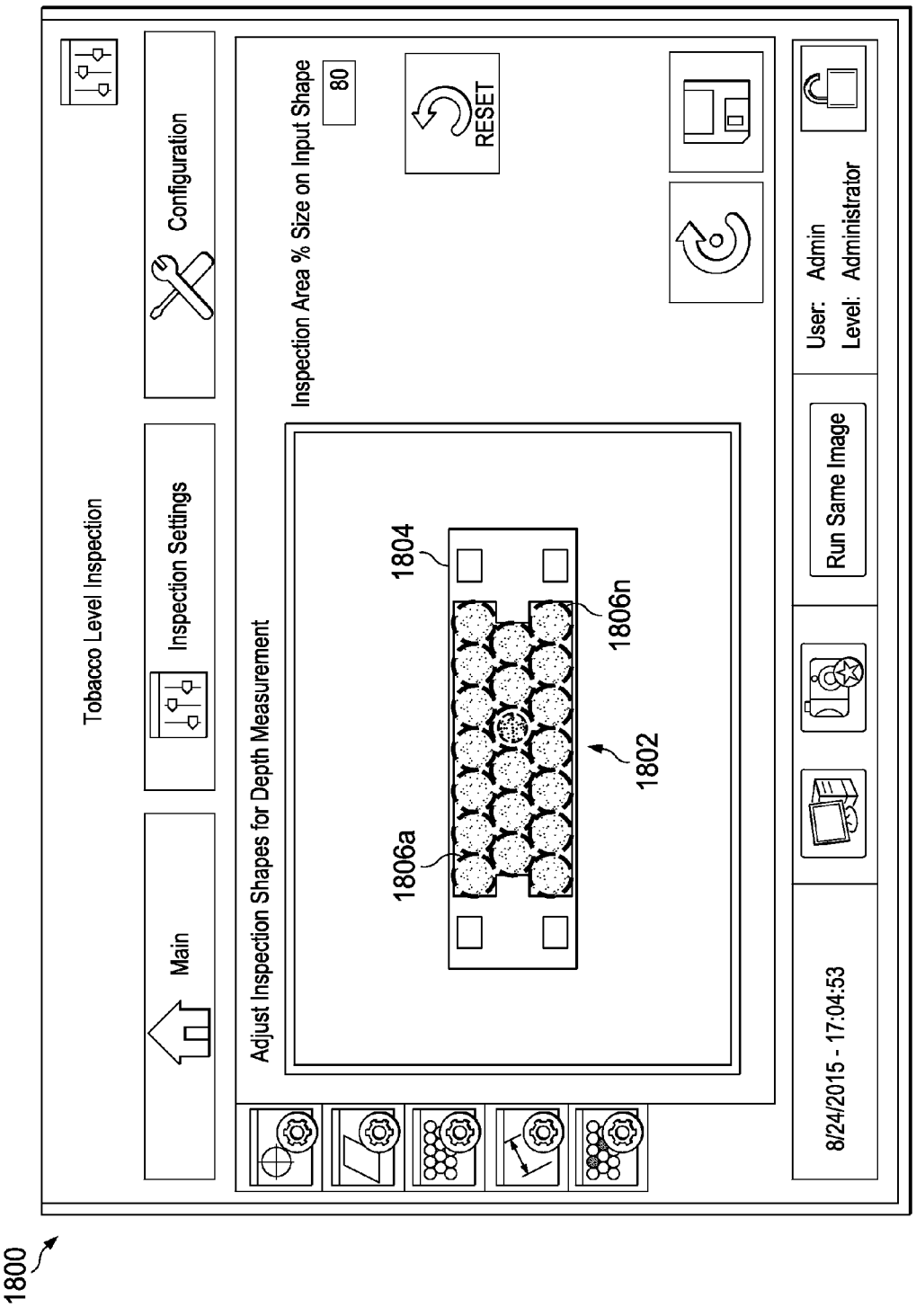
FIG. 18 is a screen shot of an illustrative tobacco level inspection tool user interface in which cigarette shapes may be specified for depth measurement inspection.

With regard to FIG. 18, a screen shot of an illustrative tobacco level inspection tool user interface 1800 in which cigarette shapes may be specified for depth measurement inspection is shown. In this user interface 1800, cigarette format shape adjustment may be made, where cigarette format or arrangement 1802 within a cigarette cartridge 1804 may be previously loaded from a dedicated panel in a configuration section of the user interface. In one embodiment, cigarette circles 1806a-1806n (collectively 1806) may be modified by a user.

Figure 19:
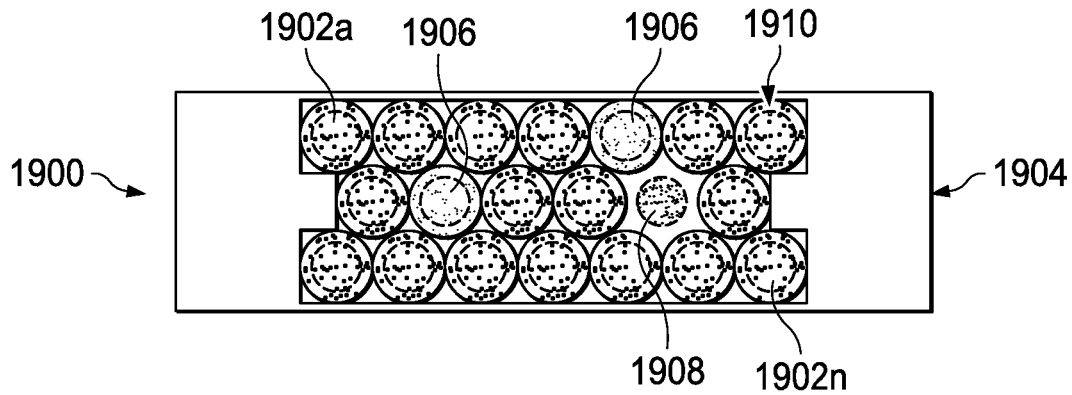
FIG. 19 is an illustration of an illustrative image of cigarettes being configured in a cigarette cartridge with superimposed indicators associated with the individual cigarettes resulting from a visual inspection using a stereographic imaging device.

With regard to FIG. 19, an illustration of an illustrative image 1900 of cigarettes 1902a-1902n (collectively 1902) being configured in a cigarette cartridge 1904 with superimposed indicators associated with the individual cigarettes resulting from a visual inspection using a stereographic imaging device is shown. As shown, there are two cigarettes 1906 with filters showing, which means the cigarettes are facing the wrong direction, one cigarette 1908 that is missing, and 3D tobacco levels for each cigarette indicated by superimposed grayscale levels 1910. In one embodiment, colored circles, such as green for pass (i.e., within specified limits), yellow for minor defect (e.g., slightly high or low levels of tobacco), and red for defects or fail (i.e., high or low levels of tobacco), may be applied to each of the cigarettes 1902. As previously described, the use of stereographic imaging devices provides for inspecting and producing both 2D and 3D inspection parameters for both sides of cigarettes. One aspect may associate both sides of the inspected cigarettes to confirm both sides of each cigarette for a set of cigarettes to be loaded into a pack of cigarettes pass the inspection.

Figure 20:
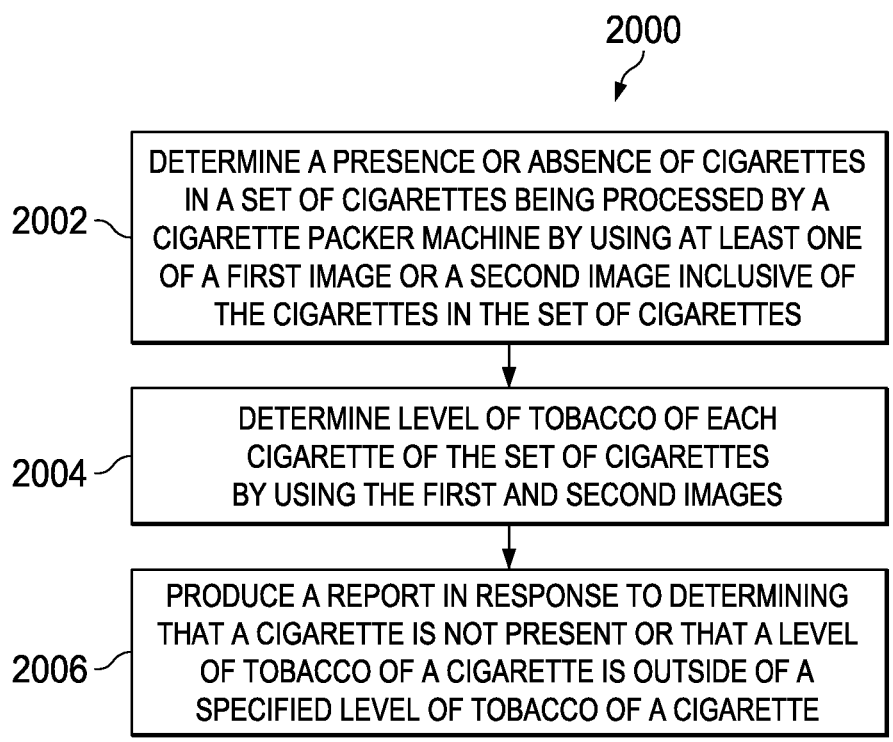
FIG. 20 is a flow diagram of an illustrative process for inspecting cigarettes using a stereoscopic imaging device.

With regard to FIG. 20, a flow diagram of an illustrative process 2000 for inspecting cigarettes using a stereoscopic imaging device is shown. The process 2000 may start at step 2002, where a presence or absence of cigarettes in a set of cigarettes being processed by a cigarette packer machine by using at least one of a first image or a second image inclusive of the cigarettes in the set of cigarettes may be determined. At step 2004, a level of tobacco of each cigarette of the set of cigarettes by using the first and second images may be determined. The level of tobacco of each cigarette may be an average or mean level computed from a depth map of the stereographic image. At step 2006, a report in response to determining that a cigarette is not present or that a level of tobacco of a cigarette is outside of a specified level of tobacco of a cigarette may be produced. The report may be an image on an electronic display showing a representation of the cigarettes along with indicia associated with each of the cigarettes. In one embodiment, the report may include a graph or table inclusive of measured levels of the cigarettes.

Although the description provided herein are focused on a cigarette inspection system, it should be understood that the principles may be applied to inspection systems of other items. For example, other inspection systems may include production of items being manufactured. In one embodiment, the use of one or more stereoscopic imaging systems that are able to provide for both 2D and 3D images that may be used in combination for determining existence and orientation of items along with 3D measurements of those items may be utilized for non-cigarette inspection systems. Alternative inspection systems may image the items individually or in bulk packages.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the principles of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc. The software may be executed locally or remotely over a communications network, such as in the "cloud."

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product. The memory, software, and processing may be local or remotely located over a communications network, such as in the "cloud."

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The previous description is of a preferred embodiment for implementing the invention, and the scope of the invention should not necessarily be limited by this description. The scope of the present invention is instead defined by the following claims.

What is claimed:

1. A cigarette inspection system, comprising:
a first imaging device configured to capture a first image of a set of cigarettes being inspected;
a second imaging device configured to capture a second image of the set of cigarettes; and
a processing unit in communication with said first and second cameras, and configured to:
determine a presence or absence of cigarettes in the set of cigarettes by using at least one of the first image or second image;
generate a stereoscopic image from the first and second images;
determine level of tobacco of each cigarette of the set of cigarettes from the generated stereoscopic image generated by using the first and second images; and
produce a report in response to determining that a cigarette is not present or that a level of tobacco of a cigarette is outside of a specified level of tobacco of a cigarette.

2. The cigarette inspection system according to claim 1, wherein said processing unit is further configured to generate a depth map of each imaged cigarette using the first and second images of each cigarette.

3. The cigarette inspection system according to claim 1, wherein said processing unit is further configured to:
determine that each cigarette in the set of cigarettes includes a filter; and
responsive to determining that a cigarette does not include a filter, generate a report inclusive of an indicator that the cigarette does not include a filter.

4. The cigarette inspection system according to claim 1, further comprising:
a first illumination device configured to produce a first light;
a second illumination device configured to produce a second light; and
wherein said first and second illumination devices are positioned to illuminate the set of cigarettes to cause a paper wrap of each cigarette to be illuminated;
wherein the first camera and the second camera are configured to image the set of cigarettes when the set of cigarettes is being illuminated by the first and second illumination devices.

5. The cigarette inspection system according to claim 4, wherein said processing unit is further configured to:
identify, from at least one of the first and second images, the paper wrap that forms an outer boundary of each cigarette, and
wherein determining depth of tobacco of each cigarette is performed by determining level of tobacco position within the outer boundary of each cigarette from a depth map formed from the first and second images.

6. The cigarette inspection system according to claim 4, wherein the first and second illumination devices produce light with at least one of blue and green wavelengths.

7. The cigarette inspection system according to claim 1, wherein said processing unit, in identifying the paper wrap of each cigarette, is further configured to establish a circular range boundary for each position of anticipated locations of cigarettes in the set of cigarettes; and
wherein said processing unit, in identifying the paper wrap of each cigarette, is configured to identify the paper wrap within the circular range boundary.

8. The cigarette inspection system according to claim 1, further comprising at least one marker on an element of the cigarette packer at a location co-planar with ends of the cigarettes; and
wherein said processing unit is further configured to calibrate a depth map based on a determined distance of the marker.

9. The cigarette inspection system according to claim 1, wherein said processing unit is further configured to:
determine location of cigarettes from either the first or second image;
generate a 3D point cloud from the first and second images for each of the identified cigarettes; and
wherein determining depth of tobacco of each cigarette is performed at each point with the 3D point cloud that corresponds to a 2D pixel from one of the first or second image.

10. The cigarette inspection system according to claim 1, further comprising a mirror positioned between the first camera and the cigarette packer machine to enable the first camera to be positioned axially closer to a wheel of the cigarette packer machine than a distance between the wheel and second camera.

11. A method, comprising:
determining a presence or absence of cigarettes in a set of cigarettes being processed by a cigarette packer machine by using at least one of a first image or a second image inclusive of the cigarettes in the set of cigarettes;
generating a stereoscopic image from the first and second images;
determining level of tobacco of each cigarette of the set of cigarettes by using the first image and second image; and
producing a report in response to determining that a cigarette is not present or that a level of tobacco of a cigarette is outside of a specified level of tobacco of a cigarette.

12. The method according to claim 11, further comprising generating a depth map of each imaged cigarette using the first and second images of each cigarette.

13. The method according to claim 11, further comprising:
determining, based on at least one of the first or second images that each cigarette in the set of cigarettes includes a filter; and
responsive to determining that a cigarette does not include a filter, generating a report inclusive of an indicator that the cigarette does not include a filter.

14. The method according to claim 11, further comprising:
producing a light having a first wavelength;
producing a light having a second wavelength; and
illuminating the set of cigarettes using the lights having the first and second wavelengths to cause a paper wrap of each cigarette to be illuminated;
imaging the set of cigarettes when the set of cigarettes is being illuminated by the lights having the first and second wavelengths.

15. The method according to claim 14, further comprising:
identifying, from at least one of the first and second images, the paper wrap that forms an outer boundary of each cigarette, and
wherein determining depth of tobacco of each cigarette is performed by determining depth of tobacco position within the outer boundary of each cigarette from a depth map formed from the first and second images.

16. The method according to claim 14, further wherein the first and second illumination devices respectively produce light of blue and green wavelengths.

17. The method according to claim 11, wherein identifying the paper wrap of each cigarette includes establishing a circular range boundary for each position of anticipated locations of cigarettes in the set of cigarettes; and
wherein identifying the paper wrap of each cigarette includes identifying the paper wrap within the circular range boundary.

18. The method according to claim 11, further comprising:
capturing an image of at least one marker on an element of the cigarette cartridge at a location co-planar with ends of the cigarettes;
determining distance from an imaging device used to capture the image of the at least one marker to the at least one marker; and
calibrating a depth map based on a determined distance of the marker.

19. The method according to claim 11, further comprising:
identifying location of cigarettes from either the first or second image;
generating a 3D point cloud from the first and second images for each of the identified cigarettes; and
wherein determining depth of tobacco of each cigarette is performed at each point with the 3D point cloud that corresponds to a 2D pixel from one of the first or second image.

20. The method according to claim 11, further comprising using a mirror to capture the image of the set of cigarettes.

* * * * *